US011146448B2

(12) United States Patent
Persaud et al.

(10) Patent No.: US 11,146,448 B2
(45) Date of Patent: Oct. 12, 2021

(54) ADAPTIVE CHANNEL ORCHESTRATION

(71) Applicant: AIRSPAN IP HOLDCO LLC, Boca Raton, FL (US)

(72) Inventors: Marlon Peter Persaud, Beaconsfield (GB); Andrew Logothetis, High Wycombe (GB); Krzysztof Dudzinski, Langley (GB); Venkateswarlu Katepalli, Slough (GB); Ashvtosh Goel, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 16/827,970

(22) Filed: Mar. 24, 2020

(65) Prior Publication Data
US 2020/0329380 A1 Oct. 15, 2020

(30) Foreign Application Priority Data

Apr. 12, 2019 (GB) ...................................... 1905222
Mar. 5, 2020 (GB) ...................................... 2003168

(51) Int. Cl.
*H04W 28/02* (2009.01)
*H04L 12/24* (2006.01)
(Continued)

(52) U.S. Cl.
CPC ..... *H04L 41/0803* (2013.01); *H04B 7/18504* (2013.01); *H04B 17/101* (2015.01);
(Continued)

(58) Field of Classification Search
CPC .. H04W 16/02–16/14; H04W 72/08–72/1236; H04W 72/04–72/042;
(Continued)

(56) References Cited

U.S. PATENT DOCUMENTS 6,211,926 B1     4/2001 Won
2006/0229104 A1 10/2006 de la Chapelle et al.
(Continued)

FOREIGN PATENT DOCUMENTS

EP    2373111 A1    10/2011
EP    3 346 784   *  9/2015   ............ H04W 72/04
(Continued)

OTHER PUBLICATIONS

Dictionary.com definition for "configuration", Jan. 5, 2021 (Year: 2021).*
(Continued)

*Primary Examiner* — Ronald Eisner
(74) *Attorney, Agent, or Firm* — Haynes Beffel & Wolfeld LLP

(57) ABSTRACT

A cellular communication apparatus includes antenna circuitry. A transceiver receives or transmits a signal using the antenna circuitry on a chosen channel of a portion of a radio spectrum. The portion of the radio spectrum is divided into one or more channels including the chosen channel each occupying a bandwidth of the portion of the radio spectrum. Control circuitry dynamically changes a configuration of the one or more channels of the radio spectrum and communication circuitry communicates the configuration of the one or more channels of the radio spectrum to one or more items of user equipment.

17 Claims, 16 Drawing Sheets

(51) Int. Cl.
| | |
|---|---|
| *H04B 17/10* | (2015.01) |
| *H04B 17/12* | (2015.01) |
| *H04B 17/18* | (2015.01) |
| *H04W 16/10* | (2009.01) |
| *H04W 72/04* | (2009.01) |
| *H04W 72/08* | (2009.01) |
| *H04B 7/185* | (2006.01) |
| *H04W 24/02* | (2009.01) |
| *H04W 24/10* | (2009.01) |
| *H04W 76/10* | (2018.01) |
| *H04L 5/00* | (2006.01) |

(52) U.S. Cl.
CPC ............ *H04B 17/12* (2015.01); *H04B 17/18* (2015.01); *H04L 5/001* (2013.01); *H04W 16/10* (2013.01); *H04W 24/02* (2013.01); *H04W 24/10* (2013.01); *H04W 72/042* (2013.01); *H04W 72/0453* (2013.01); *H04W 72/082* (2013.01); *H04W 72/085* (2013.01); *H04W 76/10* (2018.02)

(58) Field of Classification Search
CPC ..... H04W 72/0453; H04W 28/0231–28/0236; H04W 76/10; H04W 72/085; H04W 24/02; H04W 24/10; H04W 16/10; H04W 72/082; H04W 84/005; H04W 36/32; H04W 4/42; H04W 4/021; H04W 52/243; H04W 36/06; H04W 36/30; H04L 41/0803; H04L 5/001; H04L 5/006; H04B 7/18504; H04B 17/101; H04B 17/12; H04B 17/18; H04B 7/18506
See application file for complete search history.

(56) References Cited

U.S. PATENT DOCUMENTS

| | | | |
|---|---|---|---|
| 2007/0165526 A1* | 7/2007 | Lee | H04L 47/10 370/230 |
| 2009/0047971 A1 | 2/2009 | Fu | |
| 2009/0096857 A1 | 4/2009 | Frisco et al. | |
| 2009/0191877 A1 | 7/2009 | Jang et al. | |
| 2009/0221302 A1 | 9/2009 | Luiro et al. | |
| 2009/0318138 A1 | 12/2009 | Zeng et al. | |
| 2010/0197317 A1* | 8/2010 | Sadek | H04W 72/082 455/452.2 |
| 2012/0263117 A1* | 10/2012 | Love | H04L 5/003 370/329 |
| 2013/0109401 A1 | 5/2013 | Ma et al. | |
| 2013/0182655 A1* | 7/2013 | Das | H04W 52/44 370/329 |
| 2014/0086155 A1* | 3/2014 | Chen | H04L 5/0064 370/329 |
| 2014/0094165 A1 | 4/2014 | Karlsson et al. | |
| 2014/0126498 A1 | 5/2014 | Koorapaty et al. | |
| 2015/0050941 A1 | 2/2015 | Sawada et al. | |
| 2015/0172987 A1 | 6/2015 | Balakrishnan et al. | |
| 2015/0245218 A1 | 8/2015 | Hassan et al. | |
| 2015/0256314 A1* | 9/2015 | Gauvreau | H04L 5/0053 370/329 |
| 2016/0014657 A1* | 1/2016 | Le | H04W 36/0058 455/436 |
| 2017/0048863 A1 | 2/2017 | Tsai et al. | |
| 2018/0035416 A1 | 2/2018 | Yi et al. | |
| 2018/0063736 A1 | 3/2018 | Sadeghi et al. | |
| 2018/0070280 A1 | 3/2018 | Nittala et al. | |
| 2018/0084562 A1 | 3/2018 | Ramamurthi et al. | |
| 2018/0192327 A1* | 7/2018 | Gaydos | H04W 72/0446 |
| 2018/0206133 A1 | 7/2018 | Venkatraman et al. | |
| 2019/0281441 A1 | 9/2019 | Huang et al. | |
| 2019/0327631 A1 | 10/2019 | Huang et al. | |
| 2020/0092685 A1 | 3/2020 | Fehrenbach et al. | |

FOREIGN PATENT DOCUMENTS

| | | |
|---|---|---|
| EP | 2991403 A2 | 3/2016 |
| EP | 3062446 A1 | 8/2016 |
| EP | 3167654 A1 | 5/2017 |
| EP | 3346784 A1 | 7/2018 |
| EP | 3387861 A1 | 10/2018 |
| WO | 2016007295 A1 | 1/2016 |
| WO | 2017097997 A1 | 6/2017 |

OTHER PUBLICATIONS

EP Search Report from EP20166798.7 dated Aug. 28, 2020, 8 pages.
EP Search Report from EP20166810.0 dated Sep. 1, 2020, 7 pages.
GB Search Report from GB1915033.3 dated Apr. 1, 2020, 4 pages.
GB Search Report from GB2003168.8 dated Aug. 5, 2020, 5 pages.
GB Search Report from GB2003024.3 dated Nov. 13, 2020, 4 pages.
U.S. Office Action in U.S. Appl. No. 16/836,711 dated Jun. 10, 2021, 12 pages.

* cited by examiner

| Candidate Decisions | Candidate Throughput |
|---|---|
| ■□□□□ | 63.0000 |
| □■□□□ | 66.1000 |
| □□■□□ | 64.0500 |
| □□□■□ | 66.6000 |
| □□□□■ | 58.4000 |
| ■■□□□ | 64.5500 |
| □■■□□ | 65.0750 |
| □□■■□ | 65.3250 |
| □□□■■ | 62.5000 |
| ■■■□ | 64.9375 |
| □■■■ | 63.7875 |

FIG. 4C

| Available Resources $r_1$ | Candidate Decisions $d_1$ | Candidate Throughput $t_1(d_1)$ | Maximum Throughput $f^*_1(r_1)$ = max $(t_1(d_1))$ | Optimal Decision $d^*_1$ | Resource usage |
|---|---|---|---|---|---|
| (1) |  | 64.0500 | 66.6000 |  |  |
|  |  | 66.6000 |  |  |  |
|  |  | 58.4000 |  |  |  |
|  |  | 65.3250 |  |  |  |
|  |  | 62.5000 |  |  |  |
| (2) |  | 66.1000 | 66.6000 |  |  |
|  |  | 66.6000 |  |  |  |
|  |  | 58.4000 |  |  |  |
|  |  | 62.5000 |  |  |  |
| (3) |  | 66.1000 | 66.1000 |  |  |
|  |  | 64.0500 |  |  |  |
|  |  | 58.4000 |  |  |  |
|  |  | 65.0750 |  |  |  |
| (4) |  | 66.1000 | 66.6000 |  |  |
|  |  | 64.0500 |  |  |  |
|  |  | 66.6000 |  |  |  |
|  |  | 65.0750 |  |  |  |
|  |  | 65.3250 |  |  |  |
| (5) |  | 66.1000 | 66.1000 |  |  |
|  |  | 58.4000 |  |  |  |
| (6) |  | 66.1000 | 66.1000 |  |  |
|  |  | 64.0500 |  |  |  |
|  |  | 65.0750 |  |  |  |
| (7) |  | 63.0000 | 66.6000 |  |  |
|  |  | 66.6000 |  |  |  |
|  |  | 58.4000 |  |  |  |
|  |  | 62.5000 |  |  |  |
| (8) |  | 63.0000 | 64.0500 |  |  |
|  |  | 64.0500 |  |  |  |
|  |  | 58.4000 |  |  |  |
| (9) |  | 63.0000 | 66.6000 |  |  |
|  |  | 64.0500 |  |  |  |
|  |  | 66.6000 |  |  |  |
|  |  | 65.3250 |  |  |  |

| | | | | | |
|---|---|---|---|---|---|
| (10) | ■ | 63.0000 | 64.0500 | □■□ | ■□ |
| | □■ | 64.0500 | | | |
| (11) | ■ | 63.0000 | 66.1000 | ■□□ | □■□ |
| | ■□ | 66.1000 | | | |
| | □□■ | 58.4000 | | | |
| | ■□ | 64.5500 | | | |
| (12) | ■ | 63.0000 | 66.6000 | □□■ | □■□ |
| | ■□ | 66.1000 | | | |
| | □□■□ | 66.6000 | | | |
| | ■□ | 64.5500 | | | |
| (13) | ■ | 63.0000 | 66.1000 | □■□ | ■□ |
| | ■□ | 66.1000 | | | |
| | □■□ | 64.0500 | | | |
| | ■□ | 64.5500 | | | |
| | □■□ | 65.0750 | | | |
| (14) | □■□ | 66.6000 | 66.6000 | □□■ | ■□ |
| | □□□■ | 58.4000 | | | |
| | □□■□ | 62.5000 | | | |
| (15) | □■□ | 64.0500 | 64.0500 | □□■ | ■□ |
| | □□□■ | 58.4000 | | | |
| (16) | □■□ | 64.0500 | 66.6000 | □□■ | ■□■ |
| | □□■ | 66.6000 | | | |
| | □■■□ | 65.3250 | | | |
| (17) | □■□ | 64.0500 | 64.0500 | □■□ | ■ |
| (18) | ■□ | 63.0000 | 63.0000 | ■□□ | ■□ |
| | □□■ | 58.4000 | | | |
| (19) | ■□ | 63.0000 | 66.6000 | □□■ | ■ |
| | □□■□ | 66.6000 | | | |
| (20) | ■□ | 63.0000 | 66.1000 | ■□ | ■□ |
| | ■□ | 66.1000 | | | |
| | □■□ | 64.5500 | | | |
| (21) | ■□ | 58.4000 | 58.4000 | □□■ | ■ |
| (22) | □■ | 63.0000 | 63.0000 | ■□ | ■ |
| (23) | ■ | 00.0000 | 00.0000 | □ | ■ |

FIG. 4D (continued)

| Available Resources $r_2$ | Candidate Decisions $d_2$ | Candidate Throughput $t_2(d_2)$ | Resource usage $r_2 - d_2$ | Optimum Throughput from next Stage $f^*_1(r_2 - d_2)$ | Candidate Throughput for Stages #1 & #2 $t_2(d_2)+f^*_1(r_2-d_2)$ | Maximum Throughput for Stages #1 & #2 $f^*_2(r_2)$ | Optimal Decision $d^*_2$ |
|---|---|---|---|---|---|---|---|
| (1) | | 66.1000 | | 66.6000 | 132.7000 | 132.7000 | |
| | | 64.0500 | | 66.6000 | 130.6500 | | |
| | | 66.6000 | | 66.1000 | 132.7000 | | |
| | | 58.4000 | | 66.6000 | 125.0000 | | |
| | | 65.0750 | | 66.6000 | 131.6750 | | |
| | | 65.3250 | | 66.1000 | 131.4250 | | |
| | | 62.5000 | | 66.1000 | 128.6000 | | |
| | | 63.7875 | | 00.0000 | 63.7875 | | |
| (2) | | 63.0000 | | 66.6000 | 129.6000 | 130.6500 | |
| | | 64.0500 | | 66.6000 | 130.6500 | | |
| | | 66.6000 | | 64.0500 | 130.6500 | | |
| | | 58.4000 | | 66.6000 | 125.0000 | | |
| | | 65.3250 | | 63.0000 | 128.3250 | | |
| | | 62.5000 | | 64.0500 | 126.5500 | | |
| (3) | | 63.0000 | | 66.6000 | 129.6000 | 132.7000 | |
| | | 66.1000 | | 66.6000 | 132.7000 | | |
| | | 66.6000 | | 66.1000 | 132.7000 | | |
| | | 58.4000 | | 66.6000 | 125.0000 | | |
| | | 64.5500 | | 66.6000 | 131.1500 | | |
| | | 62.5000 | | 66.1000 | 128.6000 | | |
| (4) | | 63.0000 | | 66.1000 | 129.1000 | 130.1500 | |
| | | 66.1000 | | 64.0500 | 130.1500 | | |
| | | 64.0500 | | 66.1000 | 130.1500 | | |
| | | 58.4000 | | 66.1000 | 124.5000 | | |
| | | 64.5500 | | 64.0500 | 128.6000 | | |
| | | 65.0750 | | 63.0000 | 128.0750 | | |
| (5) | | 63.0000 | | 66.6000 | 129.6000 | 132.7000 | |
| | | 66.1000 | | 66.6000 | 132.7000 | | |
| | | 64.0500 | | 66.6000 | 130.6500 | | |
| | | 66.6000 | | 66.1000 | 132.7000 | | |
| | | 64.5500 | | 66.6000 | 132.1500 | | |
| | | 65.0750 | | 66.6000 | 131.6750 | | |
| | | 65.3250 | | 66.1000 | 131.4250 | | |
| | | 64.9375 | | 00.0000 | 64.9375 | | |

FIG. 4E

| | | | | | | |
|---|---|---|---|---|---|---|
| (6) | ▢▢■▢ | 64.0500 | ■■▢▢ | 66.6000 | 130.6500 | 130.6500 | ▢▢■▢ |
| | ▢▢▢■ | 66.6000 | ■▢■■ | 64.0500 | 130.6500 | | |
| | ▢▢▢■ | 58.4000 | ■■■▢ | 66.6000 | 125.0000 | | |
| | ▢▢■▢ | 65.3250 | ■■■▢ | 58.4000 | 123.7250 | | |
| | ▢▢▢■ | 62.5000 | ■▢■■ | 64.0500 | 126.5500 | | |
| (7) | ■▢▢▢ | 63.0000 | ■■▢▢ | 66.6000 | 129.6000 | 129.6000 | ■▢▢▢ |
| | ▢▢■▢ | 66.6000 | ■▢▢▢ | 63.0000 | 129.6000 | | |
| | ▢▢▢■ | 58.4000 | ▢■■■ | 66.6000 | 125.0000 | | |
| | ▢▢▢■ | 62.5000 | ▢■▢▢ | 63.0000 | 125.5000 | | |
| (8) | ■▢▢▢ | 63.0000 | ▢■■▢ | 66.1000 | 129.1000 | 129.1000 | ■▢▢▢ |
| | ▢■▢▢ | 66.1000 | ■▢▢▢ | 63.1000 | 129.1000 | | |
| | ▢▢▢■ | 58.4000 | ▢■■■ | 66.1000 | 124.5000 | | |
| | ■■▢▢ | 64.5500 | ■■■▢ | 58.4000 | 122.9500 | | |
| (9) | ■▢▢▢ | 63.0000 | ■▢■▢ | 66.1000 | 129.1000 | 130.1500 | ▢■▢▢ |
| | ▢■▢▢ | 66.1000 | ▢■▢■ | 64.0500 | 130.1500 | | |
| | ▢■■▢ | 64.0500 | ▢■■■ | 66.1000 | 130.1500 | | |
| | ■■▢▢ | 64.5500 | ■▢■▢ | 64.0500 | 128.6000 | | |
| | ▢■■▢ | 65.0750 | ■▢▢▢ | 63.0000 | 128.0750 | | |
| (10) | ■■■▢ | ▢▢▢■ | 58.0400 | ■■■■ | 00.0000 | 58.4000 | 58.4000 | ▢▢▢■ |
| (11) | ▢■■▢ | ■▢▢▢ | 63.0000 | ■■■■ | 00.0000 | 63.0000 | 63.0000 | ■▢▢▢ |

FIG. 4E (continued)

| Available Resources $r_3$ | Candidate Decisions $d_3$ | Candidate Throughput $t_3(d_3)$ | Resource usage $r_3 - d_3$ | Optimum Throughput from next Stage $f^*_2(r_3-d_3)$ | Candidate for Stages #1, #2 & #3 $t_3(d_3)+f^*_2(r_2-d_2)$ | Maximum Throughput for Stages #1, #2 & #3 $f^*_3(r_3)$ | Optimal Decision $d^*_3$ |
|---|---|---|---|---|---|---|---|
| (1) | ▟▢▢▢▢ | 63.0000 | ▟▢▢▢▢ | 132.7000 | 195.7000 | 196.7500 | ▢▟▢▢▢ |
| | ▢▟▢▢▢ | 66.1000 | ▢▟▢▢▢ | 130.6500 | 196.7500 | | |
| | ▢▢▟▢▢ | 64.0500 | ▢▢▟▢▢ | 132.7000 | 196.7500 | | |
| | ▢▢▢▟▢ | 66.6000 | ▢▢▢▟▢ | 130.1500 | 196.7500 | | |
| | ▢▢▢▢▟ | 58.4000 | ▢▢▢▢▟ | 132.7000 | 191.1000 | | |
| | ▟▟▢▢▢ | 64.5500 | ▟▟▢▢▢ | 130.6500 | 195.2000 | | |
| | ▟▢▟▢▢ | 65.0750 | ▟▢▟▢▢ | 129.6000 | 194.6750 | | |
| | ▢▟▟▢▢ | 65.3250 | ▢▟▟▢▢ | 129.1000 | 194.4250 | | |
| | ▢▢▟▟▢ | 62.5000 | ▢▢▟▟▢ | 130.1500 | 192.6500 | | |
| | ▟▟▟▢▢ | 64.9375 | ▟▟▟▢▢ | 58.4000 | 123.3375 | | |
| | ▢▟▟▟▢ | 63.7875 | ▢▟▟▟▢ | 63.0000 | 126.7875 | | |

FIG. 4F

ADAPTIVE CHANNEL ORCHESTRATION

TECHNICAL FIELD

The present disclosure relates to wireless communication. In particular, the present disclosure relates to a wireless communication apparatus and method for adaptively orchestrating channels.

DESCRIPTION

In a cellular system, channel planning can be performed in order to plan the locations of base stations, the channel/bandwidth allocations of those base stations, and the power of the transmissions in order to provide good coverage. Such planning takes into account a number of different factors such as other transmitters in the local area, the placement of buildings, and the available bandwidths in which transmission can occur (and at which powers). Such planning relies on the static nature of these factors—buildings are unlikely to move and transmitters are unlikely to stop transmitting. If such changes do occur, then the entire plan might have to be redesigned from scratch. Such a system is therefore ill-suited to a situation in which flexibility is required.

SUMMARY

Viewed from a first example configuration, there is provided a cellular communication apparatus comprising: antenna circuitry; a transceiver to receive or transmit a signal using the antenna circuitry on a chosen channel of a portion of a radio spectrum, wherein the portion of the radio spectrum is divided into one or more channels, including the chosen channel, each occupying a bandwidth of the portion of the radio spectrum; control circuitry to dynamically change a configuration of the one or more channels of the radio spectrum; and communication circuitry to communicate the configuration of the one or more channels of the radio spectrum to one or more items of user equipment.

Viewed from a second example configuration, there is provided a cellular communication method comprising: receiving or transmitting a signal using antenna circuitry on a chosen channel of a portion of a radio spectrum, wherein the portion of the radio spectrum is divided into one or more channels, including the chosen channel, each occupying a bandwidth of the portion of the radio spectrum; dynamically changing a configuration of the one or more channels of the radio spectrum; and communicating the configuration of the one or more channels of the radio spectrum to one or more items of user equipment.

Viewed from a third example configuration, there is provided a cellular communication apparatus comprising: means for receiving or transmitting a signal using antenna circuitry on a chosen channel of a portion of a radio spectrum, wherein the portion of the radio spectrum is divided into one or more channels, including the chosen channel, each occupying a bandwidth of the portion of the radio spectrum; means for dynamically changing a configuration of the one or more channels of the radio spectrum; and means for communicating the configuration of the one or more channels of the radio spectrum to one or more items of user equipment.

BRIEF DESCRIPTION OF THE DRAWINGS

The present invention will be described further, by way of example only, with reference to embodiments thereof as illustrated in the accompanying drawings, in which:

FIG. 4C illustrates the set of candidates available at each stage of the process for the creation of a single channel in the new configuration;

FIG. 4D shows the application of the first stage of the process in accordance with some embodiments;

FIG. 4E shows the application of the second stage of the process in accordance with some embodiments;

FIG. 4F shows the application of the third stage of the process in accordance with some embodiments;

DESCRIPTION OF EXAMPLE EMBODIMENTS

Figure 1:
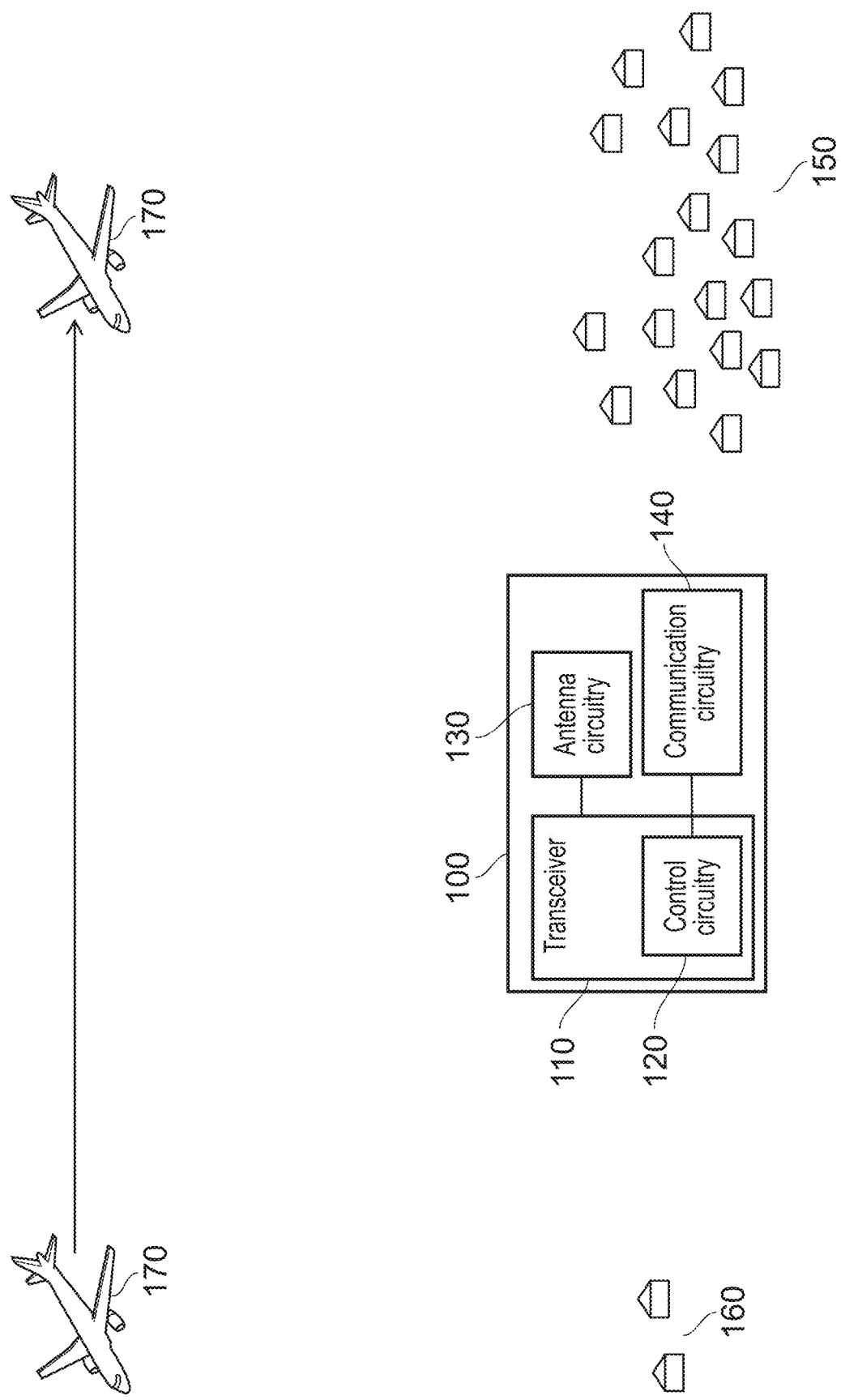
FIG. 1 illustrates a system in which a cellular communication apparatus according to some embodiments communicates with another cellular communication apparatus.

Before discussing the embodiments with reference to the accompanying figures, the following description of embodiments is provided.

In accordance with one aspect, there is provided a cellular communication apparatus comprising: antenna circuitry; a transceiver to receive or transmit a signal using the antenna circuitry on a chosen channel of a portion of a radio spectrum, wherein the portion of the radio spectrum is divided into one or more channels, including the chosen channel, each occupying a bandwidth of the portion of the radio spectrum; control circuitry to dynamically change a configuration of the one or more channels of the radio spectrum; and communication circuitry to communicate the configuration of the one or more channels of the radio spectrum to one or more items of user equipment.

In the above aspect, the cellular communication apparatus, which could take the form of a base station to which items of user equipment communicate, uses an antenna to perform communication. The antenna is capable of communicating on a number of channels. The channels are each defined as a portion of available radio spectrum. This could be defined as, for instance, a centre frequency and a width of the channel, or could be defined as a start frequency and end frequency of the channel. For instance, a first channel may occur at a centre frequency of 2428.3 MHz and have a width of 5 MHz, a second channel may have a centre frequency of 2455 MHz and have a width of 10 MHz, and a third channel may have a start frequency of 2474 MHz and an end frequency of 2475.6. The channels may be non-contiguous and/or non-overlapping. Usually, some channels are noisier (having higher levels of noise) than others, depending on the amount of interference. Such interference can come from other transmitters, which may intentionally be transmitting within the same frequency or could be transmitting in a nearby frequency that inherently 'leak' interfering signals into adjacent frequencies. The cellular communication apparatus and user equipment can compensate for the interference by increasing the transmission power or reception sensitivity of particular channels. However, there is typically a maximum total power across all channels that can be applied and therefore a network operator must be selective in how channels are configured. Such channel configurations can be derived by performing network planning. This involves the use of modelling and simulation of network components in order to establish where channels should be placed in the radio spectrum and at what power they should operate in order to provide a desired coverage. However, such processes are time consuming making them incapable of responding to changes such as new sources of interference, changes of interference and changes in demand. This can cause particular difficulties when some of the devices are moving, as may be the case with a plane for instance, since this will create frequently changing demand. Furthermore, the levels of interference will change rapidly. Further complicating the situation is the fact that different items of user equipment may have different noise profiles to each other. For instance, a plane flying across a city may have a large amount of interference in the radio spectrum where Wi-Fi occurs whereas other planes communicating with the same cellular communication apparatus far away from the city may have much smaller levels of interference in that frequency band. Such interference patterns could also change—e.g. at night, interference from Wi-Fi may be much smaller. In the above aspect, the cellular communication apparatus includes control circuitry that dynamically (e.g. on-demand) changes the configuration of the channels. The revised configuration can then be communicated to the user equipment using, e.g. a special control channel, in order to overcome changes in demand and/or interference in the network.

In accordance with some examples, the control circuitry is adapted to dynamically change the configuration of the one or more channels of the radio spectrum in response to unsolicited interference. Unsolicited interference may be considered to be interference that was not originally anticipated. For instance, unsolicited interference could come about as a consequence of a nearby transmitter transmitting into reserved areas of the radio spectrum or by unplanned levels of anticipated radio communications in the area. The control circuitry is able to dynamically (e.g. on-demand) change the configuration in order to respond to such interference. This saves the need for a new planning exercise being performed in response to interference that could arbitrarily appear and disappear.

In some examples, the control circuitry is adapted to dynamically change the configuration of the one or more channels of the radio spectrum autonomously. The behaviour of the control circuitry in these examples is such that the control circuitry is able to dynamically change the configuration by itself (e.g. without human interaction). Such configuration change may be achieved by the application of one or more algorithms that analyse interference in the radio spectrum, either from the perspective of the cellular communication apparatus and/or the user equipment, and respond accordingly.

In some examples, the control circuitry is adapted to dynamically change the configuration of the one or more channels of the radio spectrum in a decentralised manner. In some embodiments, is possible to take a number of different radio transmitters and receivers into account when determining how the configuration should be changed.

In some examples, the transceiver is adapted to receive a noise profile from the one or more items of user equipment; and the control circuitry is adapted to dynamically change the configuration of the one or more channels of the radio spectrum based on the noise profile from the one or more items of user equipment. The noise profile of an item of user equipment may be considered to be the interference levels received by that user equipment at different parts of the radio spectrum. By considering the noise profile of each of the one or more items of user equipment, it is possible to arrive at a configuration of the channels that not only considers the noise at the cellular communication apparatus, but also takes into account the noise experienced by each of the one or more items of user equipment that communicate with the cellular communication apparatus. This is important since otherwise the cellular communication apparatus could end up modifying the configuration in order to adjust the channels in such a way that some of the items of user equipment would be forced to communicate with the cellular communication apparatus on a channel that is, to those items of user equipment, noisy. This would result in lower levels of communication between the cellular communication apparatus and the items of user equipment and would consequently cause a decrease in the throughput that could be achieved. Furthermore, by considering more than one of the items of user equipment, it is possible to derive a configuration that will be generally acceptable to a large proportion of the network.

In some examples, the control circuitry is adapted to dynamically change the configuration of the one or more channels of the radio spectrum such that the one or more channels occupy areas of bandwidth having more favourable radio conditions than prior to the configuration being changed. The goal of dynamically changing of the configuration of the one or more channels may be to provide more favourable radio conditions than before the configuration was changed. Improved radio conditions can lead to faster, more accurate communication as well as the communication of more information in a shorter time. This can therefore lead to lower latency communication.

In some examples, the more favourable radio conditions comprise a lower noise than prior to the configuration being changed. One way of measuring the radio conditions is to consider the noise level. The noise level may be defined as the background signal strength at a particular frequency, which may be caused by background radiation as well as other transmitters. In particular, interference could derive from low-quality transmitters that ostensibly transmit at a particular frequency but cause a "leakage" of signal into other neighbouring frequencies. Of course, other interference could occur from other transmitters legitimately transmitting at the same frequency. Such transmitters may, for instance, belong to different radio systems that are not part of the current network.

In some examples, the more favourable radio conditions comprise a higher throughput than prior to the configuration being changed. Throughput can be considered to be the amount of data that is transferred in a space of time. More favourable radio conditions could therefore correspond with a higher throughput being achieved than was possible if the previous (unmodified) configuration.

In some examples, the more favourable radio conditions are for a majority of the one or more items of user equipment. Although in some embodiments, the revised configuration could result in more favourable radio conditions for one item of user equipment (or the cellular communication apparatus) or for a minority of the items of user equipment (possibly including the cellular communication apparatus), in other embodiments, the more favourable conditions are for a majority of the items of user equipment (possibly including the cellular communication apparatus). There is no obligation that the more favourable radio conditions occur for all of the items of user equipment. That is to say that other items of user equipment outside the majority may experience similar radio conditions, or may experience worse radio conditions than before the configuration was modified.

In some examples, the more favourable radio conditions are an average of radio conditions of the one or more items of user equipment. Rather than considering a number of the items of user equipment that obtain more favourable radio conditions, one could instead consider the average affect of applying the modified configuration. In such examples, the more favourable radio conditions result in more favourable radio conditions on average for each of the items of user equipment. Consequently, a small number of items of user equipment could achieve a very large increase in radio conditions, while other items of user equipment could experience a small decrease in radio conditions, therefore providing an overall improvement when these results are averaged. Of course, there are a number of ways in which the average could be calculated. For instance, the average could be calculated as an average improvement or an average performance. The average could also be calculated as a mean, median, mode or other type of average. In other examples, there are other goals that could be pursued by the reconfiguration. For instance, in some examples, the goal may be to improve the experience of poorly performing user equipment other than to improve the overall average experience. In some other examples, the goal may be to benefit the items of user equipment that already perform well by benefiting user equipment that is more likely to make effective use of the favourable radio conditions that are achieved. In practice, which of these goals is pursued will be dependent on the priorities of the network operator.

In some examples, the cellular communication apparatus comprises: processing circuitry to perform dynamic programming to determine the configuration of the one or more channels of the radio spectrum achieving the more favourable radio conditions. Dynamic programming can be considered to be a technique in which a large "optimisation problem" is broken down into a number of subtasks. The solution to each of those subtasks may be used in order to determine the overall solution to the "optimisation problem". By breaking down the problem in this manner, the number of different possibilities that may be considered can be dramatically reduced. In the present examples, dynamic programming is effective due to the number of combinations of channel modifications that can take place. By considering the problem in stages, it is possible to vastly reduce the number of candidate solutions to be considered. The use of dynamic programming is therefore especially well suited to the problem of channel configuration.

In some examples, a number of stages of the dynamic programming corresponds with a number of the one or more channels; and each stage of the dynamic programming is directed towards obtaining the more favourable radio conditions by considering the addition of one of the one or more channels. In such examples, each of the stages of the dynamic programming problem responds to the consideration of how to add a further channel to the new configuration. In practice, this solution may be derived 'backwards'. For example, if the new configuration is to have a maximum of n channels assigned to it then the first stage may consider how channel n is to be added to the configuration depending on all the different options for the configuration with n−1 channels allocated. For each option, the throughput (for instance) can be assessed to determine how the addition of the channel changes the situation. It is therefore possible to determine, for each starting state (allocation of n−1 channels) the best channel to add. A second stage of the process then considers how channel n−1 is to be added to the configuration depending on all the different options for the configuration with n−2 channels allocated. For each possible way to add channel n−1, the best way of adding channel n is known from the first stage. Consequently, the second stage will reveal the best way of allocating channels n and n−1 for each possible starting state. This process can be worked backwards until one considers, in an n'th stage, what the best first channel to add will be. The process can then be 'backtracked'. That is, knowing what the best first channel to add is then indicates what the best second channel to add is, and so on. The number of stages corresponds with the number of channels to be added because in some cases, the answer is trivial. For instance, if there are five possible locations to place a channel and five channels must be added then there is no need for dynamic programming to be performed—all channels are activated. Similarly, regardless of the number of possible locations for channels to be placed, if only one channel must be activated the all the different possibilities can be directly compared.

In some examples, the dynamic programming is performed a number of times corresponding to a maximum number of the one or more channels that can be supported. The process described above determines a configuration of n channels. However, as the number of channels increases, the amount of power available for other channels decreases. Therefore, it is necessary to consider different numbers of channels in case a smaller number of channels (operating at a higher power) are able to achieve a better configuration. In these embodiments, therefore, the above process is repeated for a number of times corresponding to the maximum number of channels that can be activated. Once again, the term 'corresponds' acknowledges the fact that in some situations the query could be trivial and that the full dynamic programming process (although possible) is not necessary to derive the configuration.

In some examples, the control circuitry is adapted to dynamically change the configuration by changing a centre frequency of at least one of the channels. A centre frequency of a channel may be considered to be the point at which the channels lies in the radio spectrum. A channel can be defined by using a reference point (a centre frequency, start frequency, and end frequency) and an indication of a size (bandwidth) of the channel.

In some examples, the control circuitry is adapted to dynamically change the configuration by changing a bandwidth of at least one of the channels. The bandwidth of a channel may be considered to be the other factor that defines the location of a channel. This could be a simple width of the channel, but could also be defined by an end frequency of the channel, for instance.

In some examples, the control circuitry is adapted to dynamically change the configuration by changing a power of at least one of the channels. Some channels can also be configured to transmit at different powers to different channels. In practice, many transmitters may have a maximum transmission power across all channels. For instance, a transmitter may be permitted to transmit at a total of 24 dBm. This transmission power must be spread across all channels on which the transmitter transmits. Consequently, the transmitter may be able to transmit on a single channel at high power or a number of channels at a lower power.

In some examples, the control circuitry is adapted to dynamically change a number of the channels. It will be appreciated that the changing of the number of channels on which the cellular communication apparatus can transmit also involve the changing of the centre frequency, power, and bandwidth of the newly added channels. As discussed above, an increase in the number of channels is likely (if all the power is being used) to result in other channels having a power reduced. In general, an increase in the number of channels can also result in the overhead of managing those channels.

In some examples, the transceiver is to transmit the configuration using the antenna circuitry. The configuration of the one or more channels may be transmitted using the antenna circuitry. This could occur, for instance, by using a special control channel on which configuration data is transmitted. In other examples, the configuration could be transmitted in another manner—for instance using another form of wireless communication, for instance.

In some examples, the communication circuitry comprises the transceiver. In such examples, the communication circuitry may be the transceiver itself. In other words, the same transceiver is used to both transmit the data on the one or more channels and also to transmit the configuration of the one or more channels to items of user equipment.

Particular embodiments will now be described with reference to the figures.

FIG. 1 illustrates a cellular communication apparatus 100 in accordance with some embodiments. The apparatus 100, which takes the form of a cellular base station, includes antenna circuitry 130, which could take the form of an antenna or an antenna array for instance. The antenna circuitry 130 is used by a transceiver 110 in order to transmit or receive signals. Each signal is broadcast on a particular 'channel'—a block of the radio spectrum. Although the specific frequencies at which channels occur can be arbitrarily determined, particular protocols and/or legislation may place controls on the transmission power, size, and frequency bounds at which transmissions occur. For instance, certain areas of the radio spectrum could be reserved for commercial or governmental use or could be completely open. Areas of the radio spectrum could be subject to particular restrictions (e.g. maximum transmission powers), which is particularly common in areas of the radio spectrum that are open. For example, the LTE cellular specification restricts the bandwidth of each channel to 1.4, 3, 5, 10, 15, or 20 MHz.

Typically, the configuration of radio channels, including the power, location, and width of the channels, is calculated according to the above restrictions by performing simulation and modelling. This could take into account the locations of base stations, the types of antenna used, known interferers and interference patterns, buildings, signal propagation, and so on. In practice, however, changes to any of these factors can have a significant detrimental effect on the network. For instance, if a new entity starts transmitting in the local area then this could create unanticipated or unsolicited interference. The placement of new buildings could inhibit signal propagation. The use of poorly designed antenna systems could cause interference in the form of 'leakage'. The disruption (e.g. physical movement) of an antenna could result in signals being blocked or attenuating in an unanticipated manner—for instance, line of sight could be lost. Each of these situations could cause the channel configuration to become unusable. Minor changes to the channel configuration might theoretically be feasible, but the extent to which improvements can be made may be limited. In general, changes would require the modelling and simulation to be performed again with the newly revised factors, or require the network operator to simply tolerate the detrimental effect on the network.

In the system of FIG. 1, the cellular communication apparatus 100 communicates with another cellular communication apparatus in the form of a plane 170. The plane 170 starts in a relatively isolated area 160 where interference is low. However, over the course of time, the plane 170 passes over a city 150 in which interference is much greater due to the prevalence of radio equipment (such as from Wi-Fi, Bluetooth, etc.). The cellular communication apparatus 100 of the present embodiments responds to this situation by dynamically changing the radio channel configuration. For instance, if the movement of the plane 170 to a location over a city 150 renders the existing channels unusable then the cellular communication apparatus 100 could create another channel in a part of the radio spectrum that is less congested in order to improve communication with the plane 170. If the previously used channels are no longer used then those channels can be disabled in order to provide additional power to the new channels. The control of the channel configuration is achieved by control circuitry 120. Having changed the configuration of the channels, the new configuration can be transmitted by communication circuitry 140. The communication circuitry could, for instance, transmit the configuration via another form of communication (e.g. a satellite connection) or could use (or be) the antenna circuitry 130 itself, e.g. using a special defined control channel. The modification to the channel configuration can be autonomous. In particular, it does not necessitate human intervention. The present techniques may also be decentralised. In particular, the configuration is determined by considering the situation from not only the cellular communication apparatus 100, but also at the devices that communicate with the cellular communication apparatus 100 such as the plane 170.

It will be appreciated that the present technique is not limited to fixing a reduction of network quality. The present technique can also be used to dynamically change or improve the quality or efficiency of the network where opportunities arise, as will be demonstrated with respect to the following figures.

Figure 2A:
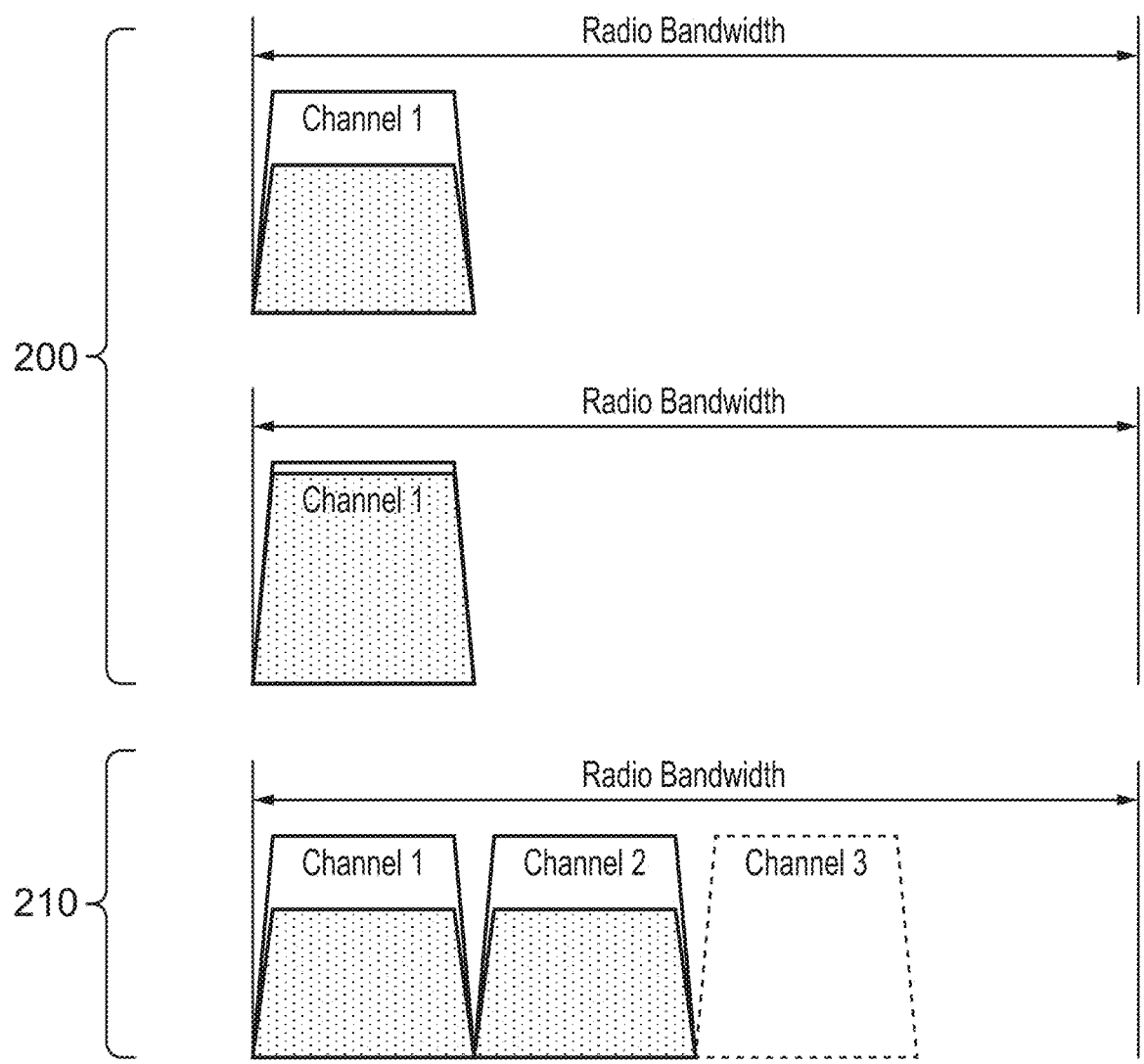
FIG. 2A illustrates one way in which the channel configuration can be adapted to handle changes in network demand in accordance with some embodiments.

FIG. 2A illustrates the manner in which the channel configuration can be adapted to handle changes in network demand. A first configuration 200 shows a single channel (Channel 1). At first, the usage of the channel (Usage 1) is approximately half of the channel's capacity. Over time, as shown in the middle of FIG. 2A, the usage increases and comes very close to the capacity of the channel. Consequently, the configuration is updated to a revised configuration 210. Here, a second channel (Channel 2) is created, the second channel being defined at a bandwidth after the end of the bandwidth used by the first channel (Channel 1). Users can then be split between the two channels. In due course, if both channels become congested then a third channel (Channel 3) can be created and so on. Of course, it will be appreciated that there is a finite limit to this. In particular, the product of the bandwidth and power across all channels could be limited. The addition of channels might therefore cause the transmission power of each channel to drop slightly (limiting communication distance and/or speed) in exchange for the greater capacity.

Figure 2B:
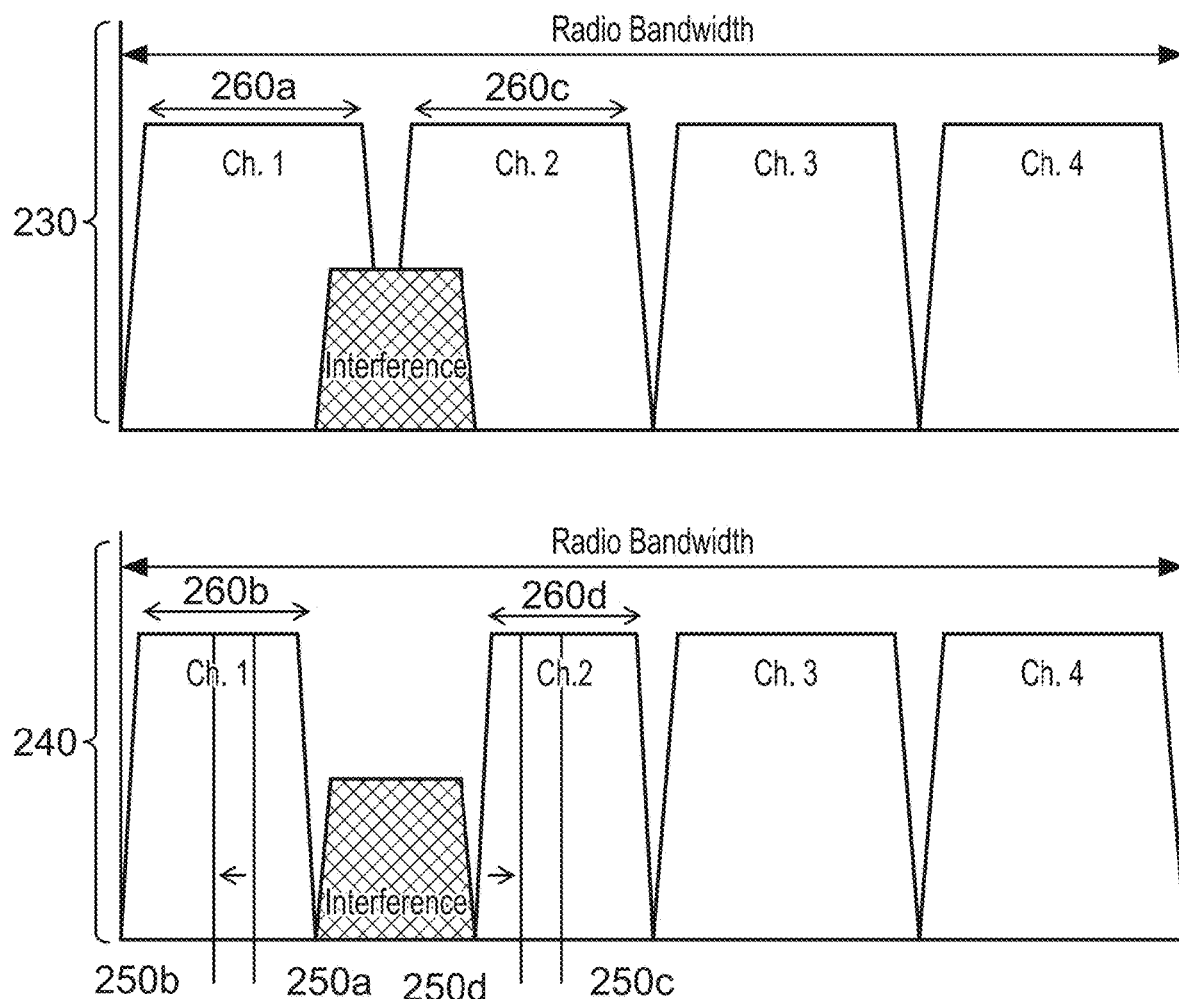
FIG. 2B illustrates one way in which the channel configuration can be adapted to handle changes in network demand in accordance with some embodiments.

FIG. 2B shows the use of the present technique in responding to unsolicited/unplanned interference. In a first configuration 230, four channels of equal power are provided. However, interference occurs at a bandwidth that partially eclipses the first and second channels. Such interference could originate, for instance, from increased background noise, or could occur from a third party radio transmission. The interference limits the effective capacity of the network. In particular, legitimate transmissions (those made or desired by the network operator) may have to transmit at a higher power in order to be heard over the interference. Retransmissions may be necessary, which increases the latency of the network and also reduces its capacity. Where transmissions are scheduled, scheduling may have to take place outside the time when the interference occurs—thereby limiting the available transmission time and the effective capacity of the network. Consequently, the present technique reconfigures the channel configuration to provide a revised configuration 240. Here, the bandwidth of the first channel 260a is reduced 260b and the bandwidth the second channel 260c is reduced 260d. Furthermore, the centre-point (the central frequency) of the first channel 250a is moved 250b and the centre-point of the second channel 250c is moved 250d. In this way, the new configuration 240 moves the channels so that they avoid the frequencies at which interference occurs.

Figure 2C:
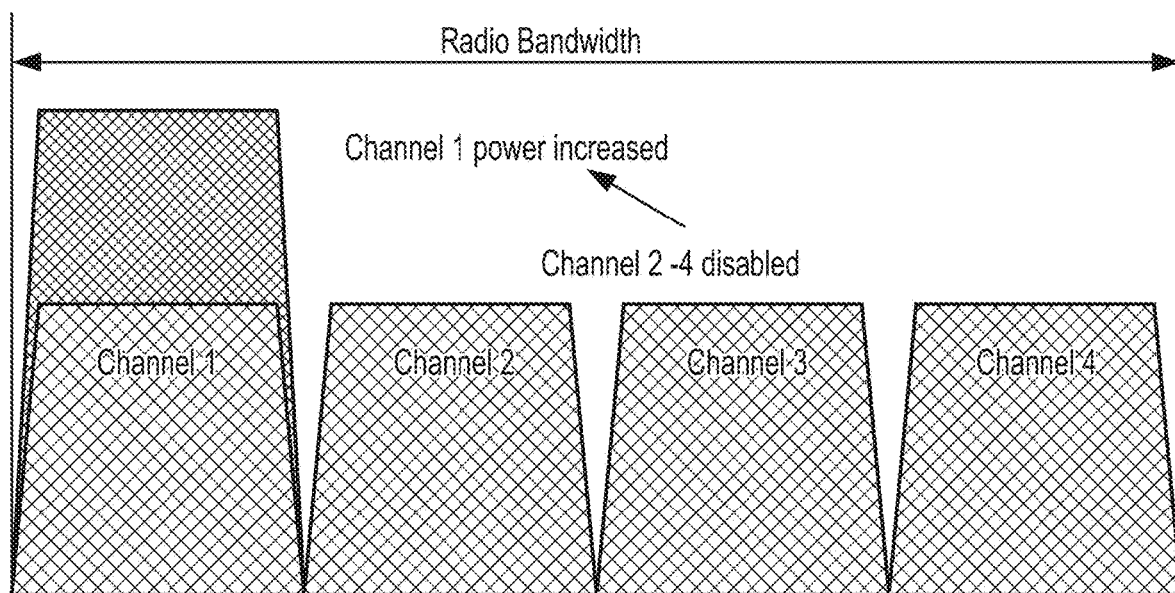
FIG. 2C illustrates one way in which the channel configuration can be adapted to handle changes in network demand in accordance with some embodiments.

FIG. 2C shows how the present technique can be used to boost transmission power. In FIG. 2C, each of four channels split the overall permitted transmission power. Channels 2-4 are then disabled. If users are not using those channels then this should have no detrimental effect. If users are using those channels they can be moved onto the remaining channel 1. Having disabled channels 2-4, it is possible to boost the power used for channel 1 (as illustrated in FIG. 2C). In practice, the boost that is achieved by diverting power from the three other channels should be approximately:

$$10 \times \log_{10} 4/1 = 6 \text{ dB}$$

By increasing the transmission power, the signal to noise ratio (SNR) for channel 1 can be improved. This allows not only communication with devices that are further away from the cellular communication apparatus 100 (due to attenuation occurring over a longer distance) but also decreases the error rate in radio transmission—leading to fewer retransmissions and greater throughput.

Figure 2D:
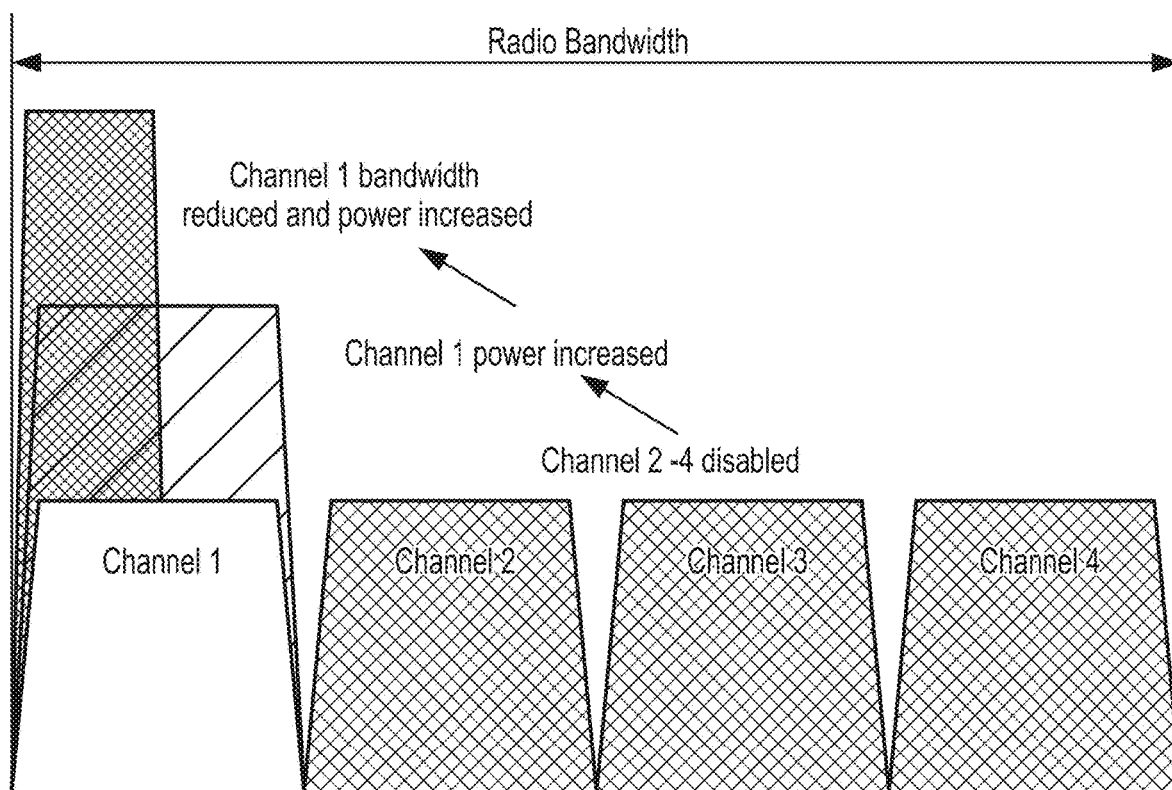
FIG. 2D illustrates one way in which the channel configuration can be adapted to handle changes in network demand in accordance with some embodiments.

FIG. 2D illustrates an extension to this idea in which the bandwidth of the first channel is also decreased in order to allow further power boosting. This power boost, however, comes at the cost of decreased bandwidth, which may limit the number of users that can simultaneously communicate with the cellular communication apparatus 100.

It will be appreciated that although these techniques have been shown separately, they can be freely combined or used on different occasions depending on the circumstances.

Figure 3:
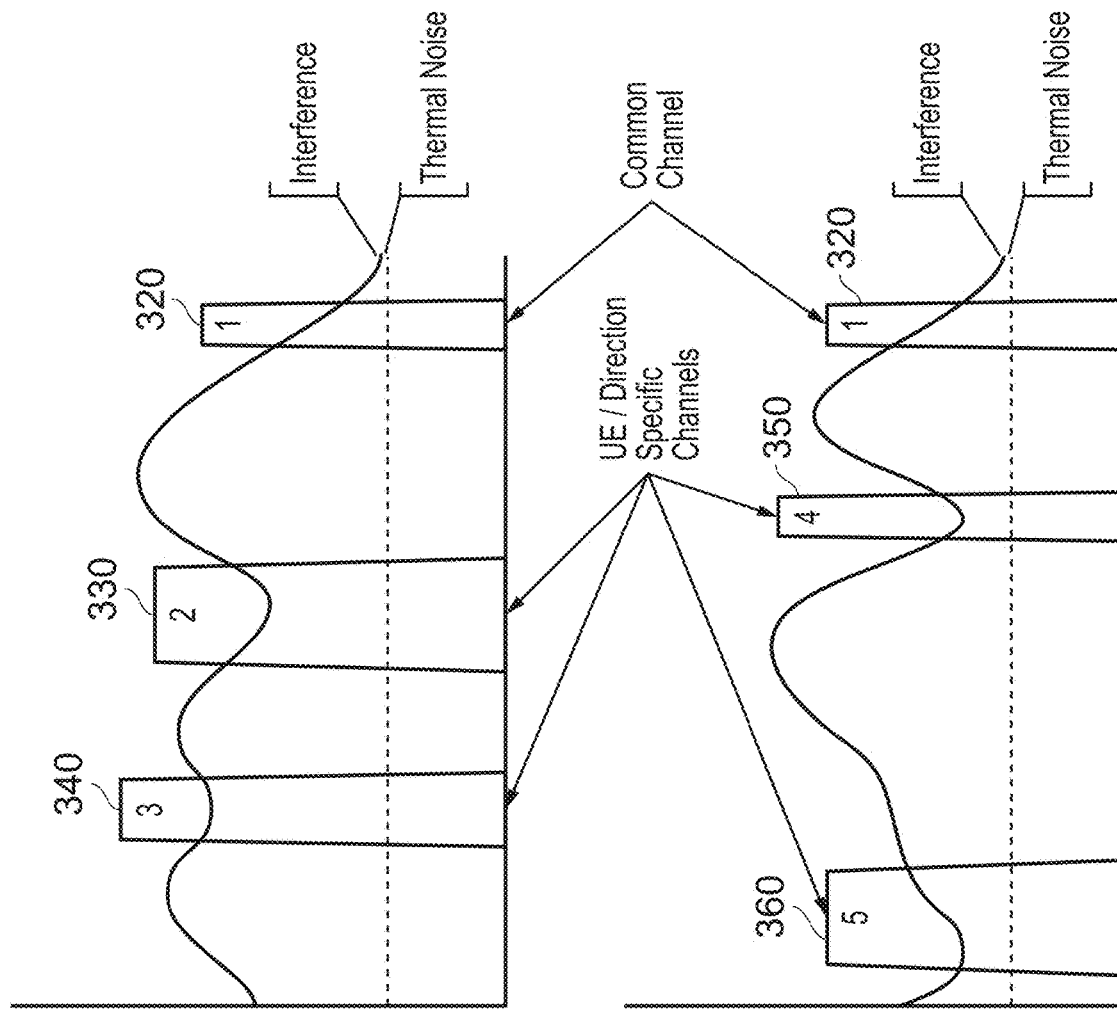
FIG. 3 illustrates the way in which the noise profile for different devices that communicate with the cellular communication apparatus may differ.

FIG. 3 illustrates how the "noise profile" for different devices 300, 310 that communicate with the cellular communication apparatus 100 may differ. In particular, FIG. 3 illustrates a thermal noise (shown by a dashed line) for both the first device 300 and the second device 310. The thermal noise line is approximately the same for both devise, since this is largely caused by, e.g. background radiation, which may be expected to be relatively similar within a local region. However, the interference line (shown as a solid line) for the two devices 300, 310 is different. Both of the devices experience low interference at the top end of the radio spectrum and so both devices share a common channel (1) 320. Since the interference is low for both devices 300, 310, the power for that channel 320 is also low—a high transmission power is not necessitated by the interference. The first device 300 experiences a dip in interference at the middle of the radio spectrum, resulting in a mid-sized channel (2) 330 in the middle of the spectrum of moderate power. The first device 300 also experiences a small, narrow dip in interference at the bottom end of the spectrum, resulting in the creation of a narrow channel (3) 340 created with high power—the high power being necessary to overcome the higher interference than is experienced at the other channels 320, 330.

The second device 310 has a mostly different noise profile. Since the interference is low for the top end of the spectrum, the second device 310 also makes us of one of the channels (1) 320. The second device 310 experiences a high interference at the frequency associated with the other channels 330, 340 established for the first device 300. Consequently, these channels are not used by the second device 310. Instead, a channel (4) 350 is created for the second device 310 at a point in the middle of the spectrum where the interference in the radio spectrum sharply drops briefly. This channel (4) 350 is able to use a mid-level of power owing to its small bandwidth. Finally, the first device 310 experiences a low level of interference for a large part of the low end of the spectrum. This results in a wide channel (5) 360 being created. Given that the channel is wide and that the interference is low, the power usage for this channel 310 is also low.

The cellular communication apparatus 100 therefore provides a channel configuration using five channels. The channels are configured in order to take advantage of the points in the spectrum where interference is low for each of the first device 300 and the second device 310. In this way, both devices 300, 310 are able to communicate with the cellular communication apparatus 100 efficiently.

In this manner, the determination of the channel configuration can be decentralised and can take into account the noise profiles of different devices 300, 310 in the network, rather than simply relying on the noise profile at the cellular communication apparatus 100. The noise profile of each of the devices 300, 310 can be determined by those devices performing frequency scanning at allowed frequencies. At each permitted frequency, each device 300, 310 can determine the amount of interference experienced. This information can then be provided to the cellular communication apparatus 100, which determines the channel configuration using the noise profile information from each device. There are a number of ways in which the configuration can be determined. In some situations, a strategy might be to create channels of high power to take advantage of low interference, thereby achieving high throughput. In some situations, a strategy might be to create channels of high power to overcome high interference, thereby compensating for devices that might not otherwise be able to communicate well with the cellular communication apparatus 100. In general, the purpose of selecting and configuring the channels may be considered to be one of creating more favourable radio conditions (e.g. a higher throughput or achieving less noise/interference) during communication. Such conditions may be considered for one of the devices 300, 310, for a subset of the devices, or for all of the devices. For instance, the strategy used might seek to favour one device 300, 310 at the cost of all others, or might seek to improve the situation for as many devices 300, 310 as possible. Clearly, the strategy that is employed will depend on the nature of the network and the priorities of the network operator.

Below, a method of determining a configuration is explained, which seeks to improve the overall throughput for the cellular communication apparatus 100. Such a strategy might restrict communication with one device 300 if this will achieve a higher overall throughput for the cellular communication apparatus 100. This technique can be considered to be an application of dynamic programming. In particular, rather than consider every single possible combination of channels for each of the users, which would be time consuming due to the number of possibilities, the problem is broken up into stages, with each stage considering the addition of a further channel. The end solution makes use of Bellman's principle of optimality, which in this instance acknowledges the fact that when considering the addition of an n'th channel, the new configuration can only be optimal if the previous configuration of (n−1) channels is optimal among all the possible configurations for (n−1) channels. Note that in practice, this assumption is not necessarily true since it might be the case that it is better to make use of a smaller number of channels. However, for now, the assumption will be held to be true. In particular, it will be assumed that in a configuration in which there are to be n channels, each channel that is added will always use 1/n of the available power—even if all the other channels are not currently active. For instance, if the goal is to create a solution using four channels, then each channel will always use ¼ of the available power regardless of how many channels are present at the current stage of the solution. This simplification will then be resolved, as will be shown with respect to FIG. 5.

Note that in practice, it is not necessary to perform dynamic programming for trivial cases. For instance, if there are five possible channels that can be activated, then a five channel solution does not necessitate dynamic programming since all channels will have to be activated. Similarly in a situation where only a single channel is to be activated, it is sufficient to examine which single channel would provide the most desirable configuration. In this way the number of times the below technique is to be applied is not necessarily equal to the maximum number of channels.

Figure 4A:
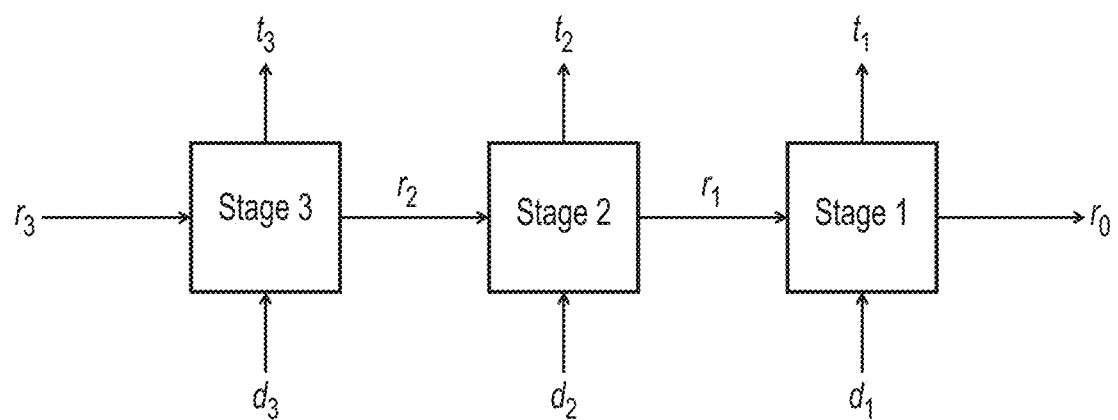
FIG. 4A schematically illustrates the overview of a three stage process for determining the allocation of three channels in a new configuration in accordance with some embodiments.

As explained above, the process is made up from a number of stages. Each stage builds up the solution to cover the desired number of channels, with up to one channel being added at each stage. For example, a (max) four channel solution is made up from four stages. The process works backwards. The first stage considers the addition of the fourth channel for each way in which three channels can be allocated. The second stage considers the addition of the third channel for each way in which two channels can be added, and so on. This is illustrated by FIG. 4A, which illustrates a three stage process (e.g. in which the final solution uses three channels). The inputs and outputs to each stage can be defined as follows:

$r_0$: Areas of available bandwidth after allocation of channels 1 to 3 have taken place $r_a$ (for a≥1): Areas of available bandwidth for channels 1 to a after allocation takes place in stages 3 to a $d_b$: Bandwidth allocated for channel (4-b)

b: Expected throughput for channel (4-b)

$d_b^*$: Optimal resources allocated for channel (4-b), which maximises $f_b^*(r_b)$ $f_1^*(r_1)$: Maximum throughput at first stage (e.g. for channel 3), given initial available resources $r_1$, i.e. $f_1(r1)$=max (for all valid $d_1$ given $r_1$): ($t_1$ ($d_1$))

$f_2^*(r_2)$: Maximum throughput at second stage (e.g. for channels 2 and 3), given initial available resources $r_2$, i.e. $f_2^*(r_2)$=max(for all valid $d_2$ given $r_2$): ($t_2$ ($d_2$)+$f_1^*(r_2-d_2)$)

$f_3^*(r_3)$: Maximum throughput at third stage (e.g. for channels 1 to 3), given initial available resources $r_3$, i.e. $f_3^*(r_3)$=max(for all valid $d_3$ given $r_3$): ($t_3(d_3)+f_2^*(r_3-d_3)$)

The example shown below illustrates the process for a three channel solution and makes the following assumptions:

There are five blocks of 5 MHz that can be allocated to channels. In the description, these will be represented by a bit string in which a '0' represents an unallocated block and a '1' represents an allocated block.

Each channel may have a contiguous bandwidth of 5, 10, or 20 MHz—i.e. 1 block, 2 blocks, or 4 blocks.

There are two devices that communicate with the cellular communication apparatus 100.

Each channel uses ⅓ of the total available power consumption, regardless of bandwidth or number of active channels.

Figure 4B:
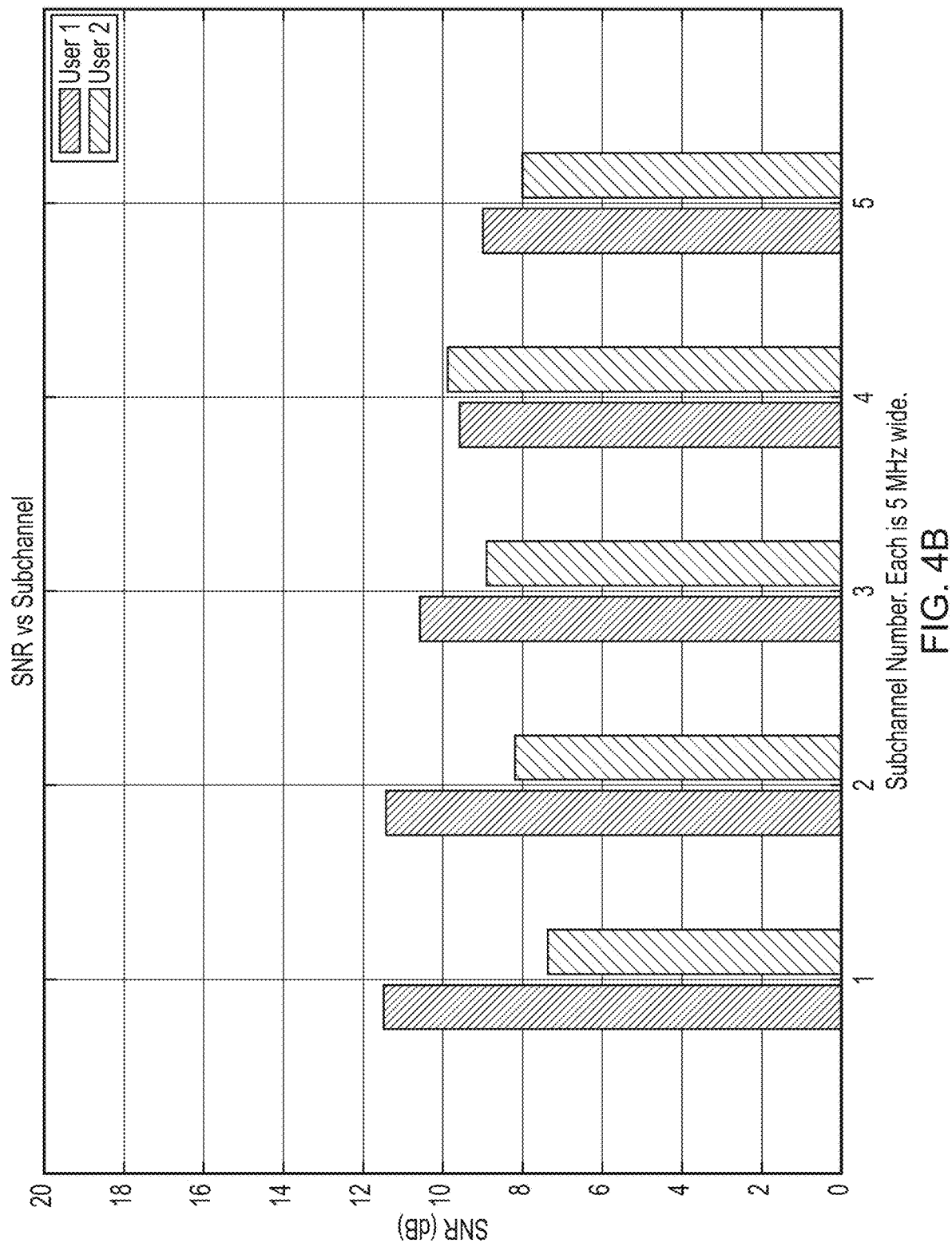
FIG. 4B illustrates the signal to noise (SNR) ratio that can be achieved by each of two users (devices) for each of five channels.

FIG. 4B illustrates the signal to noise (SNR) ratio that can be achieved by each of two users (devices) for each of the five bandwidth blocks. As illustrated in FIG. 4A, user 2 generally has a lower SNR than user 1 on most channels. This is most pronounced on channel 1. On channel 4, the SNR of user 2 is slightly higher than for user 1. The goal of the calculation is to determine which three (or fewer) channels will produce the best overall throughput.

Note that throughout this example, channel allocated are represented as a series of boxes. A filled (black) box indicates that the channel has been allocated/enabled, while an unfilled (white) box indicates that the channel has not been allocated/enabled and is available. A filled black box, followed by a white box, followed by a black box, followed by a white box, followed by a black box would therefore be represented by the bit string '10101'.

FIG. 4C illustrates the set of candidates available at each stage for the creation of a single channel. As a reminder, each channel must have a contiguous bandwidth of 5 MHz (one block), 10 MHz (two blocks), or 20 MHz (four blocks). There are therefore eleven different ways that a single channel can be created, which are illustrated in FIG. 4C. In addition, FIG. 4C illustrates the throughput that is achieved when each of these configurations is used. That is to say that when the third configuration is applied, in which a single channel of 5 MHz is created using the third block of bandwidth '00100', a throughput of 64.0500 Mbps is achieved among all devices communicating with the cellular communication apparatus 100. Similarly, when a single channel of 10 MHz is created using blocks one and two '11000', a throughput of 64.5500 Mbps is achieved. This information can be determined by measurement at the cellular communication apparatus 100.

FIG. 4D shows the application of the first stage of the process. The first stage considers how a third channel can be allocated. It therefore considers all possible configurations of the first two channels—these are shown in the column "Available Resources". For each of these initial configurations, there remain a number of possible ways in which the third channel can be allocated using the current resource usage. These are illustrated, for each possible option for the "Available Resources" in the "Candidate Decisions" column. A "Candidate Decision" cannot use part of the bandwidth that has been allocated to another channel. The "Candidate Throughput" for each of the "Candidate Decisions" is derived using the table shown in FIG. 4C, which shows the throughput that can be achieved from a single channel. The column "Maximum Throughput" then shows the maximum throughput that can be achieved from any of the "Candidate Decisions" for a given option of "Available Resources". The column "Optimal Decision" shows the corresponding configuration of third channel that provides the "Maximum Throughput" and the "Resource Usage" is the combination of the "Available Resources" and "Optimal Decision".

For example, consider the row 400 in which the current resources are defined as the bit string '10010'. That is to say that a first channel uses the first block of 5 MHz, and a second channel uses the $4^{th}$ block of 5 MHz. The row 400 considers a candidate solution in which the third channel uses the second block. For the configuration being considered, we can see from FIG. 4C that the throughput that can be achieved is 66.1000 Mbps. That is to say that FIG. 4C shows that the channel '01000' achieves 66.1000 MHz. In this case, this is the best throughput that can be achieved from the candidates that are available. The resulting resource usage that would occur if this option was selected is shown in the column as "Resource Usage". It is represented by the bit string '11010', and is achieved by combining the bit strings '10010', which is the starting resource usage and '01000', which is the resource usage of the channel that yields the best throughput.

FIG. 4D therefore shows for each possible allocation of two channels (of which there are 23 possibilities), what the resulting best option would be for the allocation of the third channel.

FIG. 4E shows the application of the second stage of the process. The second stage considers how the second channel can be allocated. It therefore considers all possible configurations of the first channel—shown in the "Available Resources" column. The "Candidate Decisions" column shows the possible allocations for the second channel, given the available radio spectrum. It will be appreciated that there are generally more candidate decisions in the second stage than in the first stage because in the second stage there is more likely to be more unused bandwidth. The "Candidate Throughput" column shows the throughput that can be achieved for each "Candidate Decision" and is again calculated using FIG. 4C. The "Resource Usage" column is again calculated by combining the "Candidate Decision" with the "Available Resources". The "Optimum Throughput from next stage" column considers the maximum throughput that can be achieved if using the "Resource Usage" as a candidate in the first stage. The "Candidate Throughput for Stages #1 and #2" column then combines the throughput achieved for the "Candidate Decision" in stage 2 together with the maximum throughput that can be achieved with the resource usage, using stage 1. The column "Maximum Throughput for Stages #1 and #2" then determines the maximum throughput from each of these candidates and the "Optimal Decision" column illustrates the "Candidate Decision" that leads to that optimal throughput for stages 1 and 2.

For example, consider the row 410, which represents a situation in which the resource usage is represented by the bit string '10000'. The candidate decision of this row 410 is '00010'. It is known from FIG. 4C that the throughput achieved by using such a channel is 66.6000 Mbps. The resource usage would then be '10010'. We know from the first stage, and particularly row 400 in FIG. 4D that when the resource usage is '10010', the maximum throughput that can be achieved from the unused resources is 66.1000. Consequently, the best throughput that can be achieved from the candidate '00010' when the initial available resources are '10000' is 66.6000+66.1000=132.7000 Mbps. In practice, this is the maximum throughput that can be achieved among all candidates for the starting resources of '10000' and as stated, this is achieved by using a channel '01000'.

FIG. 4E therefore shows for each possible allocation of one channel (of which there are 11 possibilities), what the resulting best option would be for the allocation of the second and third channels. In particular, each option for the second channel is considered, and the resulting resource usage is analysed to determine how those resources could be best allocated. The calculated throughput for each candidate is the sum of the throughput that can be achieved with the allocation of the second channel and the best throughput that can be achieved with what would then be left (using the results of the first stage).

FIG. 4F shows the application of the third stage of the process. The third stage considers how the first channel can be allocated. In this stage, since only three channels are allocated, all of the resources are available for allocation. There is only, therefore, a single starting state (shown in the "Available Resources" column) of '00000'. Each of the "Candidate Decisions" considers a different possibility for the allocation of the first channel. It will be appreciated that these and the "Candidate Throughputs" match the possibilities enumerated in FIG. 4C. Again, the "Resources Usage" column illustrates the resources that are available depending on which candidate decision is selected. In practice, in this final stage, it matches the "Candidate Decisions" column, since the "Candidate Decisions" column shows all of the resources that have been allocated. The "Optimum Throughput from next stage" is calculated with reference to the second stage. In particular, given each possibility for the "Resource Usage", the second stage is referenced to determine the maximum throughput that can be achieved. The "Candidate Throughput for stages #1, #2, and #3" column is the sum of the column "Optimum Throughput from next stage" and "Candidate Throughput". It therefore represents the total throughput that can be achieved by considering the throughput achieved for a particular candidate and the maximum throughput that can be achieved using the resource usage. The "Maximum Throughput for Stages #1, #2, and #3" then looks at the maximum of these values, and the "Optimal Decision" indicates which of these options produces the best (e.g. maximum) throughput.

For example, consider the row 420. The candidate decision of this row 410 is '10000'. It is known from FIG. 4C that the throughput achieved by using this channel is 63.0000 Mbps. The resource usage would then be '10000'. We know from the second stage, and particularly row 410 in FIG. 4E that when the resource usage is '10000', the maximum throughput that can be achieved from the unused resources is 132.7000 Mbps. Consequently, the best throughput that can be achieved from the candidate '10000' is 63.0000+132.7000=195.7000 Mbps.

In practice, the maximum throughput that can be achieved from any candidate is 196.7600, which is achieved when starting with the selecting of the channel '01000'.

FIG. 4F therefore shows for each possible choice of the first channel (of which there are 11 possibilities), what the resulting best option would be for the allocation of the first, second, and third channels. In particular, each option for the first channel is considered, and the resulting resources usage is analysed to determine how those resources could be best allocated. The calculated throughput for each candidate is the sum of the throughput that can be achieved with the allocation of the first channel and the best throughput that can be achieved with what would then be left (using the results of the second stage).

A process of "backtracking" can then be used to establish the overall best result. From FIG. 4F we can see that the optimal decision is the channel '01000'. From FIG. 4E, we can see that, given the allocation '01000', the best choice is the channel '00100', which means that the resource usage would be '01100'. From FIG. 4D, we can see that given a resource usage of '01100', the best option is the channel '00010'. Consequently, the best overall resource usage is '01110', for a total throughput of 196.7500 Mbps. This therefore represents the ideal configuration of channels—three channels, each of 5 MHz, in the positions '01110'.

The above description illustrates how the process can be used to select the allocation of up to three channels.

The above process can clearly be extended to remove some of the initial assumptions at the cost of introducing further candidates. For instance, the current process assumes that all channels are allocated an equal amount of power. However, this is not necessarily the case and one could elect to use a first channel at three times the power of a second channel. Similarly, for convenience the above example assumed that there were five blocks of bandwidth available in which channels could be created. However, there could be more blocks of bandwidth available in more locations. Clearly, however, the finer the granularity of the channel centre frequency, the higher the number of candidates to be considered, and the more time consuming the process will take to execute.

Figure 5:
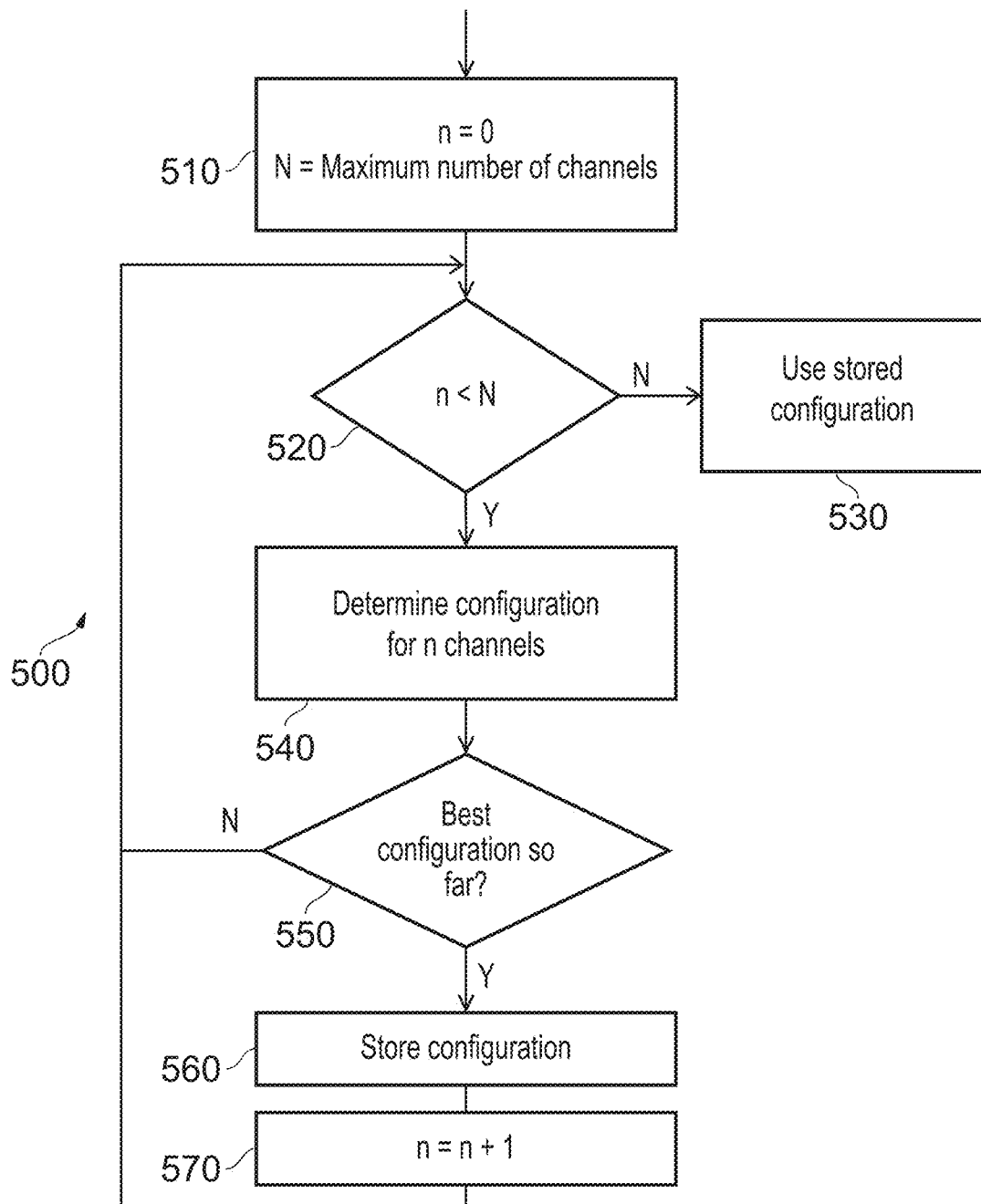
FIG. 5 illustrates a flow chart that shows how the application of the process can be performed in such a manner as to consider different numbers of channels, in accordance with some embodiments.

As originally stated, it is not necessarily true that the optimal solution for three channels will use the optimal solution for two channels. This is because in real life, if only two channels are used as opposed to three channels, then more power is available to provide to those two channels. This might result in a higher throughput being achieved. FIG. 5 illustrates the way to compensate for the above simplification.

FIG. 5 illustrates a flow chart 500. At a step 510, the value n is set to 0 and the value N is set to the maximum number of channels that can be allocated or created as supported by the hardware, protocol and any legislative restrictions. At a step 520, a loop begins. If n is less than N then at step 540, the configuration for up to n channels is determined as shown above, for instance. At a step 550, it is determined whether the resulting configuration is the best (highest throughput achieving) configuration that has been encountered so far. If not, then the process returns to step 520 where the loop begins again. If so (e.g. if no configuration has yet been encountered) then at step 560, the configuration is stored. Then, at step 570, n is incremented (e.g. by 1) and the loop begins again. If, at step 540, n is not less than N, then at step 530 the stored configuration is used.

In summary the above flowchart describes a method in which the optimal configuration is selected for each possible maximum number of channels. In the above example, it was stated that a configuration having two channels may be superior to a configuration having three channels and that this would not be picked up when determining the configuration for three channels (where each channel uses ⅓ of the available power). The process illustrate in FIG. 5 will determine this, however, since it includes explicitly determining a configuration having two channels in which each channel uses ½ the available power rather than ⅓ of the available power. The superior configuration will therefore be picked up this manner. The above technique therefore performs dynamic programming a number of times equal to the maximum number of channels that can be created—each time considering an end solution having a different number of channels. For instance, if the maximum number of channels that can be theoretically created is five, then the process is executed to provide a one channel solution, then a two channel solution, then a three channel solution, then a four channel solution, then a five channel solution. The best solution (e.g. achieving the highest throughput) is then selected as the selected channel configuration.

Figure 6:
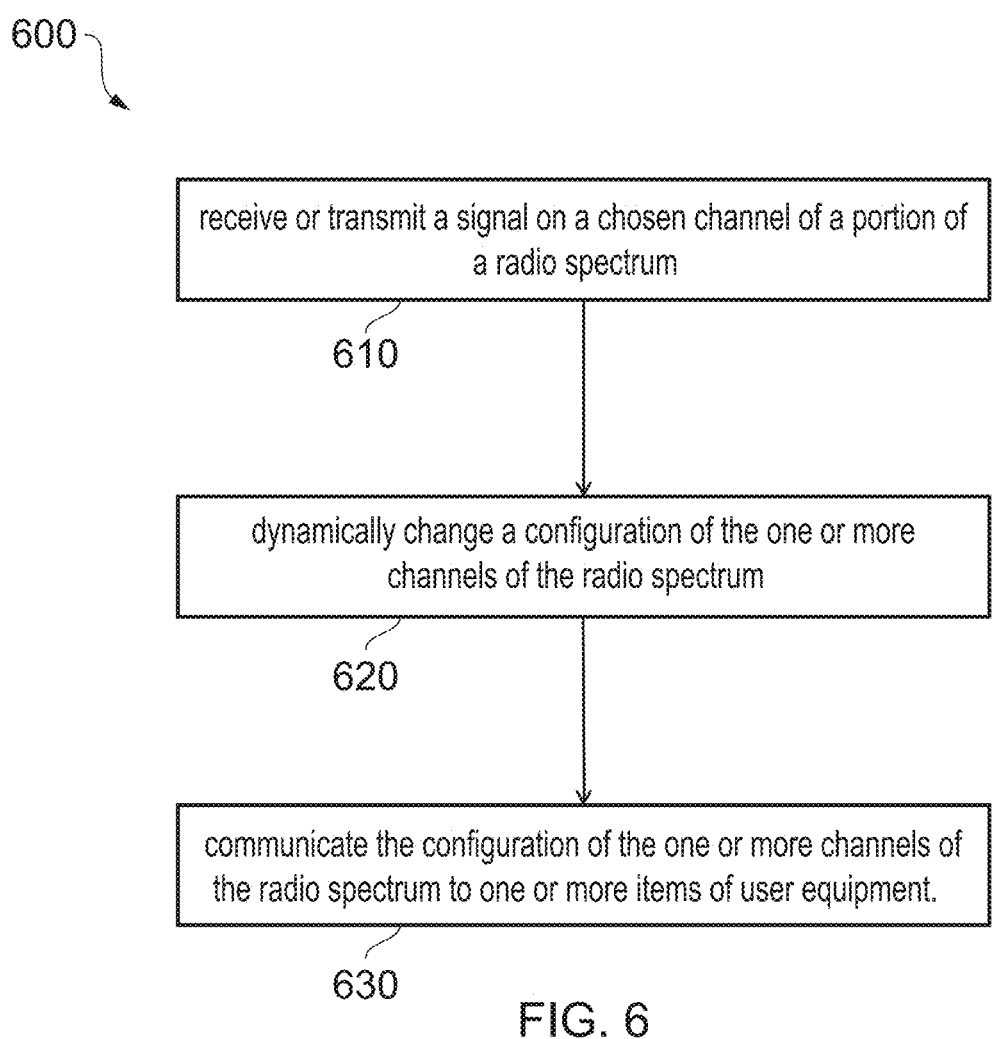
FIG. 6 shows a flowchart that illustrates a method of cellular communication in accordance with some embodiments.

FIG. 6 shows a flowchart 600 that illustrates a method of cellular communication in accordance with some embodiments. At a step 610, a signal is transmitted or received on a chosen channel, which is a portion of a radio spectrum. At a step 620, the configuration of the channels within the radio spectrum is changed. This change occurs dynamically, e.g. in response to unsolicited or unexpected interference occurring. Then, at a step 630, the new configuration is communicated to one or more items of user equipment. The communication could take place using the main antenna system of the cellular apparatus or could take place in another form altogether.

The above description illustrates how cellular equipment can collaborate in order to determine the configuration of channels. The width, location, and number of channels can be dynamically changed in order to respond to interference that may be experienced by one or more items of equipment or to respond to changes in demand. Several methods of calculating a configuration have been demonstrated, including a process that operates using dynamic programming. In this way, the allocation of the channels can be configured to achieve better radio conditions than might otherwise be possible and changes can be made to the configuration without the need for complex modelling of base stations, receivers, interferers, etc.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A cellular communication apparatus comprising:
antenna circuitry;
a transceiver to receive or transmit a signal using the antenna circuitry on a chosen channel of a portion of a radio spectrum, wherein the portion of the radio spectrum is divided into a plurality of channels, including the chosen channel, each occupying a bandwidth of the portion of the radio spectrum, and to detect interference at a bandwidth that partially overlaps the chosen channel;

control circuitry to dynamically change a configuration of the plurality of channels of the radio spectrum by changing a bandwidth and a center frequency of the plurality of channels, by deactivating a selection of unused channels of the plurality of channels, and by increasing a power of the chosen channel, to minimize overlap between the interference and the plurality of channels; and communication circuitry to communicate the configuration of the plurality of channels of the radio spectrum to one or more items of user equipment.

2. The cellular communication apparatus according to claim 1, wherein the control circuitry is adapted to dynamically change the configuration of the plurality of channels of the radio spectrum in response to unsolicited interference.

3. The cellular communication apparatus according to claim 1, wherein the control circuitry is adapted to dynamically change the configuration of the plurality of channels of the radio spectrum autonomously.

4. The cellular communication apparatus according to claim 3, wherein the control circuitry is adapted to dynamically change the configuration of the plurality of channels of the radio spectrum in a decentralised manner.

5. The cellular communication apparatus according to claim 1, wherein the transceiver is adapted to receive a noise profile from the one or more items of user equipment; and the control circuitry is adapted to dynamically change the configuration of the plurality of channels of the radio spectrum based on the noise profile from the one or more items of user equipment.

6. The cellular communication apparatus according to claim 1, wherein the control circuitry is adapted to dynamically change the configuration of the plurality of channels of the radio spectrum such that the plurality of channels occupy areas of bandwidth having more favourable radio conditions than prior to the configuration being changed.

7. The cellular communication apparatus according to claim 6, wherein the more favourable radio conditions comprise a lower noise than prior to the configuration being changed.

8. The cellular communication apparatus according to claim 6, wherein the more favourable radio conditions comprise a higher throughput than prior to the configuration being changed.

9. The cellular communication apparatus according to claim 6, wherein the more favourable radio conditions are for a majority of the one or more items of user equipment.

10. The cellular communication apparatus according to claim 6, wherein the more favourable radio conditions are an average of radio conditions of the one or more items of user equipment.

11. The cellular communication apparatus according to claim 6, comprising: processing circuitry to perform dynamic programming to determine the configuration of the plurality of channels of the radio spectrum achieving the more favourable radio conditions.

12. The cellular communication apparatus according to claim 11, wherein a number of stages of the dynamic programming corresponds with a number of the plurality of channels; and each stage of the dynamic programming is directed towards obtaining the more favourable radio conditions by considering the addition of one of the plurality of channels.

13. The cellular communication apparatus according to claim 12, wherein the dynamic programming is performed a number of times corresponding to a maximum number of the plurality of channels that can be supported.

14. The cellular communication apparatus according to claim 1, wherein the control circuitry is adapted to dynamically change a number of the channels in the plurality of channels.

15. The cellular communication apparatus according to claim 1, wherein the transceiver is to transmit the configuration using the antenna circuitry.

16. A cellular communication method comprising:
receiving or transmitting a signal using antenna circuitry on a chosen channel of a portion of a radio spectrum, wherein the portion of the radio spectrum is divided into a plurality of channels, including the chosen channel, each occupying a bandwidth of the portion of the radio spectrum;
detecting interference at a bandwidth that partially overlaps the chosen channel;
dynamically changing a configuration of the plurality of channels of the radio spectrum by changing a bandwidth and a center frequency of the plurality of channels, by deactivating a selection of unused channels of the plurality of channels, and by increasing a power of the chosen channel, to reduce overlap between the interference and the plurality of channels; and
communicating the configuration of the plurality of channels of the radio spectrum to one or more items of user equipment.

17. A cellular communication apparatus comprising:
transceiver means for receiving or transmitting a signal using antenna circuitry on a chosen channel of a portion of a radio spectrum, wherein the portion of the radio spectrum is divided into plurality of channels, including the chosen channel, each occupying a bandwidth of the portion of the radio spectrum, and to detect interference at a bandwidth that partially overlaps the chosen channel;
processor means for dynamically changing a configuration of the plurality of channels of the radio spectrum by changing a bandwidth and a center frequency of the plurality of channels, by deactivating a selection of unused channels of the plurality of channels, and by increasing a power of the chosen channel, to reduce overlap between the interference and the plurality of channels; and
communication circuitry means for communicating the configuration of the plurality of channels of the radio spectrum to one or more items of user equipment.

* * * * *